United States Patent Office 2,931,808
Patented Apr. 5, 1960

2,931,808

16-CYANO-5-PREGNENE-3,20-DIOL AND DERIVATIVES

John A. Cella, Skokie, Ill., assignor to G. D. Searle & Co., Chicago, Ill., a corporation of Delaware No Drawing. Application March 20, 1956
Serial No. 572,630

10 Claims. (Cl. 260—239.57)

This invention relates to 3-oxygenated 16-cyanopregnen-20-ols, their esters, and carboxylic acids derived by hydrolysis thereof. More particularly, this invention relates to compounds of the formula

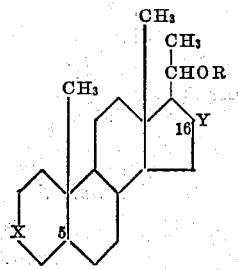

wherein R is selected from the group consisting of hydrogen and lower alkanoyl radicals; X is selected from the group consisting of hydroxymethylene, (lower alkanoyl)oxymethylene, and carbonyl radicals; the 16-substituent, Y, is selected from the group consisting of cyano, carboxyl, and (lower alkoxy)carbonyl radicals; and there is a double bond attached to the carbon atom in position number 5.

The lower alkanoyl and lower alkoxy radicals contemplated in the foregoing structural formula are defined by the expressions

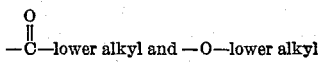

respectively, wherein the lower alkyl radicals comprehended are methyl, ethyl, propyl, isopropyl, butyl, isobutyl, secondary butyl, tertiary butyl, pentyl, secondary normal pentyl, primary isopentyl, secondary isopentyl, tertiary pentyl, hexyl, and similar $C_nH_{2n+1}$ radicals such that $n$ is a positive integer amounting to less than 7.

The compounds of this invention are useful because of their valuable pharmacological properties. Thus, for example, the disclosed compounds are potent anti-hormonal agents. Administered conjointly with cortisone, they block the atrophying effect thereof on the lymph nodes, and inhibit, in particular species, cortisone-induced susceptibility to disease, without in any way impairing the curative effects of this widely accepted medicament. Still another manifestation of the characteristic anti-hormonal activity hereinabove remarked is found in the depressor action of the subject materials on desoxycorticosterone-induced hypertension.

The compounds to which this invention relates are relatively insoluble in water, but may be dissolved in one or more of such common organic solvents as alcohol, ethyl acetate, chloroform, toluene, and dioxan. The compounds may be administered in solid form as tablets; dissolved or suspended in aqueous media, they may be given parenterally.

Manufacture of the compounds of this invention is accomplished by subjecting a 16(α or β)-cyanopregnenolone to reduction with an agent capable of converting the 20-oxo function to hydroxyl—for example, sodium borohydride—the claimed product being hydrolysed, as desired, with such as caustic potash in aqueous alcoholic solvent at the boiling point to give the corresponding hydroxy acid, likewise a compound comprehended by the instant claims. Either the hydroxy acid or parent hydroxynitrile is convertible to the corresponding 3-oxo derivative claimed, by Oppenhauer oxidation; and alkanoyl ester radicals appropriate to the limitations of the claims may be introduced into the various compounds by techniques such as the pyridine and acid anhydride treatment hereinafter detailed.

It will be appreciated by those skilled in the art that whereas the hydroxy acid representation of the compounds of this invention above and in the claims set forth is appropriate to a ready understanding of the cogeneric nature of the invention, and not withstanding that each and every compound is believed to participate at least to some degree in the particular representation specified, nevertheless, those compounds hereof wherein a 16-carboxyl radical is in the beta position are capable of lactonizing with a 20-hydroxyl group, either alpha- or beta-disposed; and indeed such substances are believed to predominate in the lactone form. It follows from this that both hydroxy acid and corresponding lactone are contemplated for the purposes and intent of this disclosure, and each or both of these modifications are alike inherent in the concept and application of the invention here and now described. Similar equivalence with respect to compositions claimed prevails as to non-toxic salts of the disclosed acids, such salts being formed by interaction of an acid with an alkali or alkaline earth metal, or with ammonium hydroxide.

The following examples describe in detail certain of the compounds illustrative of this invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted. Specific rotations refer to the D line of sodium and were determined in dioxan solution at room temperatures.

*Example 1*

*3β,20-diacetoxy-16α-cyanopregn-5-ene.*—To a solution of 20 parts of 16α-cyanopregnenolone (prepared by the method of Example 1 in U.S. Patent No. 2,817,671) in 400 parts of anhydrous alcohol at the boiling point is slowly added a solution of 8 parts of sodium borohydride in 40 parts of water. The reaction mixture is maintained at reflux temperatures for 1 hour, then neutralized by cautious addition of acetic acid to the point where no further evolution of hydrogen occurs. The resultant solution is poured into an excess of water, whereupon the precipitate formed is collected on a filter and dried. This material is heated in a mixture of 150 parts of acetic anhydride and 100 parts of pyridine for ½ hour at reflux temperatures to assure complete esterification of the hydroxyl radicals in positions 3 and 20. The acetylation mixture is quenched in 500 parts of ice water, and the precipitate thereupon thrown down is recovered on a filter and pressed dry. Recrystallization from ethyl alcohol affords the desired 3β,20-diacetoxy-16α-cyanopregn-5-ene melting at 208–210° C. Specific rotation is —56°. The product has the formula

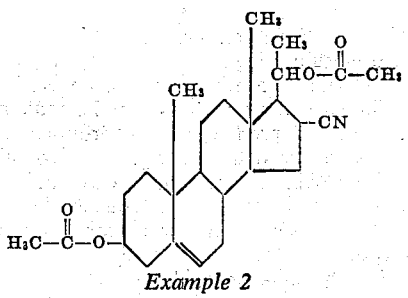

Example 2

*16α-cyanopregn-5-ene-3β,20-diol.*—Approximately 9 parts of 3β,20-diacetoxy-16β-cyanopregn-5-ene is dissolved in 160 parts of anhydrous alcohol containing 10 parts of caustic potash. This solution is refluxed for 5 minutes and then thrown into excess water. The precipitate which forms is filtered off and serially recrystallized from methyl alcohol and ethyl acetate. There is obtained by this procedure pure 16α-cyanopregn-5-ene-3β,20-diol melting at 228–230° C. and characterized by a specific rotation of —73°. The product has the formula

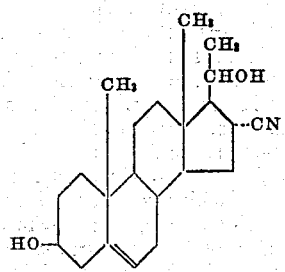

Example 3

*3β-acetoxy-20-hydroxypregn-5-ene-16β-carboxylic acid.*—A solution of 30 parts of 3β,20-diacetoxy-16α-cyanopregn-5-ene in a solution of 200 parts of caustic potash in 500 parts of water and 800 parts of absolute alcohol is refluxed in a nitrogen atmosphere for 3 days. The mixture is then cooled and acidified with concentrated muriatic acid, whereupon the precipitate which forms is filtered off, pressed as dry as possible on the filter, and finally slurried with benzene. Water is removed by azeotropic distillation, following which the benzene slurry is evaporated to dryness. The residue is treated with a mixture of 100 parts of pyridine and 250 parts of acetic anhydride at 90–100° C. for 2 hours, the reactants thereafter being left to stand overnight at room temperatures. Further reaction is terminated by pouring the reaction mixture into 1000 parts of ice water. The precipitate thrown down is collected and dried, finally being purified by chromatographic adsorption on silica gel, using benzene and ethyl acetate as developing solvents. Elution with a mixture of 5% ethyl acetate and 95% benzene affords 3β-acetoxy-20-hydroxypregn-5-ene-16β-carboxylic acid which is further purified by crystallization from absolute alcohol. The product shows a specific rotation of —35° and predominates as the gamma lactone, melting at 238–240° C. The formula for the lactone may be written

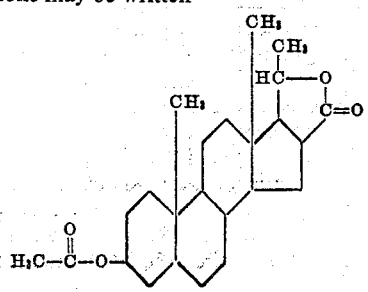

Example 4

*3β,20-diacetoxypregn-5-ene-16α-carboxylic acid.*—Further elution of the silica gel chromatogram used to purify 3β-acetoxy-20-hydroxypregn-5-ene-16β-carboxylic acid in accordance with the technique of the immediately preceding Example 3 affords the corresponding 16α-carboxylic acid, a mixture of 10% ethyl acetate and 90% benzene being preferable for this purpose. The 3β,20-diacetoxypregn-5-ene-16α-carboxylic acid thus obtained is still further purified by crystallization from a mixture of 9 parts of cyclohexane and 1 part ethyl acetate. The product melts at approximately 184–185° C., shows a specific rotation of —52.8°, and has the formula

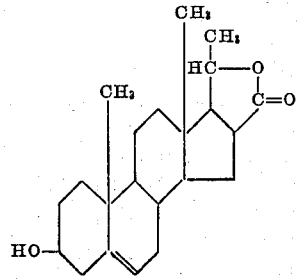

Example 5

A. *3β,20-dihydroxypregn-5-ene-16β-carboxylic acid.*—A mixture of 1 part of 3β-acetoxy-20-hydroxypregn-5-ene-16β-carboxylic acid with 4 parts of 5% aqueous caustic potash and 24 parts of methyl alcohol is heated at reflux temperatures for 15 minutes, following which the reactants are poured into excess water made acid with muriatic acid. The 3β,20-dihydroxypregn-5-ene-16β-carboxylic acid thereupon precipitated is filtered off and purified by washing on the filter with water. The product has the lactonic formula B. *20-hydroxy-3-oxopregn-4-ene-16β-carboxylic acid.*—The dried product obtained in the foregoing part A of this example is dissolved in 87 parts of toluene and 7 parts of cyclohexanone, and to this solution at reflux temperatures is added approximately 5 parts of a 20% solution of aluminum isopropylate in toluene. The reactants are maintained at reflux temperatures for 15 minutes, following which 4 parts of concentrated muriatic acid and 100 parts of water are added and the organic solvents then removed from the reaction mixture by steam distillation. The aqueous distilland, after cooling, is subjected to filtration to remove the solid product thrown down. Recrystallization from a 1:1 mixture of isopropyl ether and ethyl acetate affords pure 20-hydroxy-3-oxopregn-4-ene-16β-carboxylic acid, which, in the lactone form, first melts at 183–185° C. momentarily re-solidifies above this temperature, and melts again at 188–190° C. Like the product of Example 3, 20-hydroxy- 3-oxopregn-4-ene-16β-carboxylic acid is believed to exist principally as the gamma lactone, the formula of which is

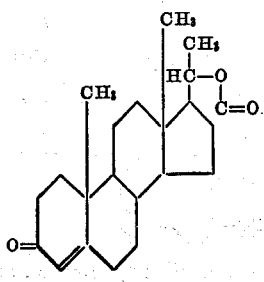

Example 6

A. 20-acetoxy-3β-hydroxypregn-5-ene-16α - carboxylic acid.—To a solution of 1 part of sodium in a mixture of 350 parts of absolute alcohol and 55 parts of water is added 10 parts of 3β,20-diacetoxypregn-5-ene-16α-carboxylic acid and just sufficient phenolphthalein to impart a red color. The reactants are heated at reflux temperatures until the red color disappears (overnight), whereupon the solution is made acid to litmus and then quenched in excess water. The precipitate which forms is collected and dried. The product is 20-acetoxy-3β-hydroxypregn-5-ene-16α-carboxylic acid, having the formula

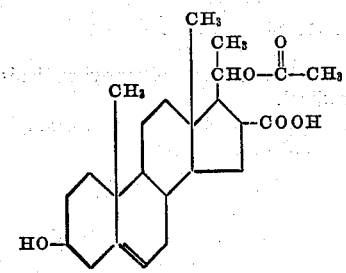

B. Methyl 20 - acetoxy - 3β - hydroxypregn - 5 - ene-16α-carboxylic.—The alcohol obtained by the procedure described in the foregoing part A of this example is suspended in 65 parts of dioxan, to which suspension is then added an excess of diazomethane in ether. Upon removal of solvents by vacuum distillation there is left as the residue, methyl 20-acetoxy-3β-hydroxypregn-5-ene-16α-carboxylate of the formula

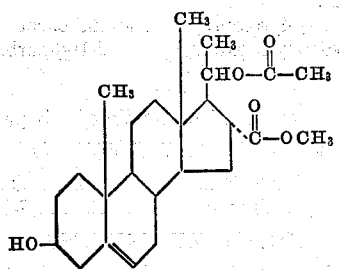

C. Methyl 20 - acetoxy - 3 - oxopregn - 4 - ene - 16α-carboxylate.—The ester of part B of this example is taken up in a mixture of 95 parts of toluene and 10 parts of cyclohexanone. To the resultant solution is added 9 parts of aluminum isopropylate dissolved in 45 parts of toluene. The reactants are refluxed for 15 minutes, following which the aluminum complex formed in process is hydrolyzed with a saturated aqueous solution of Rochelle salts. Organic solvents are removed by steam distillation, whereupon the reaction products are extracted from the aqueous phase with chloroform. The chloroform extract is evaporated to dryness; and the residue is chromatographed on silica gel, using benzene and ethyl acetate as developing solvents. From the eluate comprising 90 parts of benzene and 10 parts of ethyl acetate there is obtained methyl 20-acetoxy-3-oxopregn-4-ene-16α-carboxylate, which is resistant to crystallization and the determination of a significant melting point, but which manifests the characteristic strong ester and α,β-unsaturated ketone infrared absorption bands at 5.78 and 6.03 microns, respectively, and a weaker α,β-unsaturated ketone band at 6.20 microns. The product has the formula

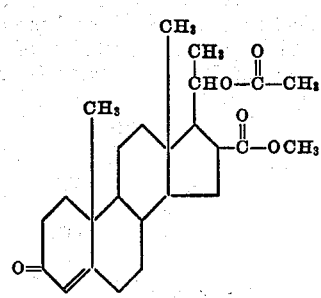

D. Methyl 20 - hydroxy - 3 - oxopregn - 4 - ene - 16α-carboxylic.—Following separation of methyl 20-acetoxy-3-oxopregn-4-ene-16α-carboxylate from the silica gel chromatogram in part C of this example, there is obtained by elution with a mixture of 70 parts of benzene and 30 parts of ethyl acetate a material which, recrystallized from normal hexane melts at 128–130° C. and shows a specific rotation of 31.2°. The product momentarily resolidifies above 130° C. and melts again at 144–146° C. This material is methyl 20-hydroxy-3-oxopregn-4-ene-16α-carboxylate. The product has the formula

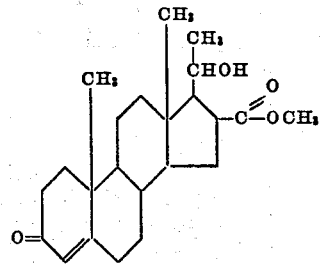

E. 20-acetoxy-3-oxopregn-4-ene-16α-carboxylic acid.—The acetoxy methyl ester obtained via part C of this example is saponified by treatment of 1 part ester with 50 parts of a 5% solution of caustic soda in 50% aqueous alcohol. The 20-hydroxyl group is then reesterified by acetylation with 5 parts of acetic anhydride and 1 part of pyridine for each part of alcoholic acid. Chromatography on silica gel, using benzene and ethyl acetate as developing solvents, affords pure 20-acetoxy-3-oxopregn-4-ene-16α-carboxylic acid which, upon recrystallization from a mixture of ethyl acetate and isopropyl ether, melts at 239–243° C. and is further characterized by a specific rotation of 66.20. The product has the formula

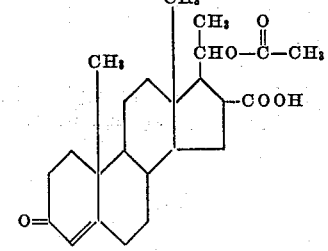

Example 7

*16α-cyano-20-hydroxypregn-4-ene-3-one.*—To a solution of 20 parts of 16α-cyanopregn-5-ene-3β,20-diol in a mixture of 180 parts of dry toluene and 5 parts of cyclohexanone at the boiling point is quickly added a solution of 1 part of aluminum isopropylate in 45 parts of dry toluene. The reactants are heated at reflux temperatures for 10 minutes, following which the aluminum complex formed is quickly hydrolysed with 50 parts of 10% aqueous muriatic acid. Organic solvents are removed by steam distillation, and the reaction product is then extracted from the aqueous phase with chloroform. Removal of chloroform by evaporation and chromatography of the residue on silica gel, using benzene and ethyl acetate as developing solvents, affords in the eluate comprising 3 parts of benzene to each 1 part of ethyl acetate a material which, recrystallized from benzene, melts at 215–219° C. and has a specific rotation of 47.6°. The product is 16α-cyano-20-hydroxypregn-4-ene-3-one. It has the formula

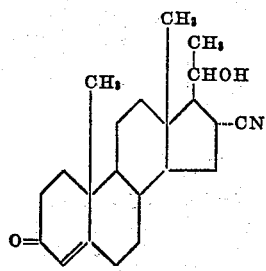

What is claimed is:
1. A compound of the formula

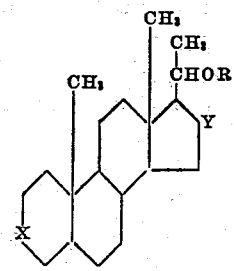

wherein R is selected from the group consisting of hydrogen and lower alkanoyl radicals; X is selected from the group consisting of hydroxymethylene, (lower alkanoyl)oxymethylene, and carbonyl radicals; the 16-substituent, Y, is selected from the group consisting of cyano, carboxyl, and (lower alkoxy(carbonyl radicals; and there is a double bond attached to the carbon atom in position number 5 which is 4(5) when X is carbonyl and 5(6) otherwise.

2. A compound of the formula

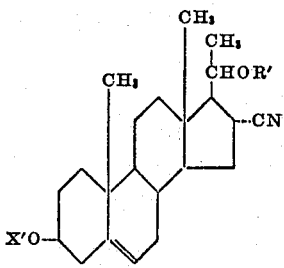

wherein R' and X' are lower alkanoyl radicals.
3. 3β,20-diacetoxy-16α-cyanopregn-5-ene.

4. A compound of the formula

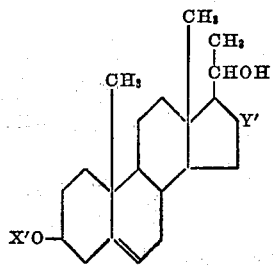

wherein X' is a lower alkanoyl radical, and Y' is a carboxyl radical.

5. 3β - acetoxy - 20 - hydroxypregn - 5 - ene - 16β - carboxylic acid lactone.

6. A compound of the formula

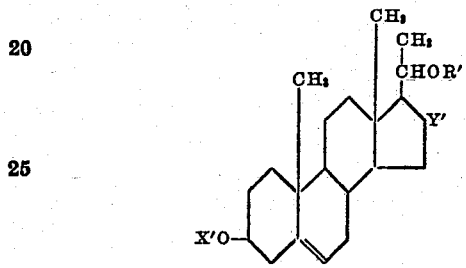

wherein X' and R' are lower alkanoyl radicals, and Y' is a carboxyl radical.

7. 3β,20-diacetoxypregn-5-ene-16α-carboxylic acid.
8. A compound of the formula

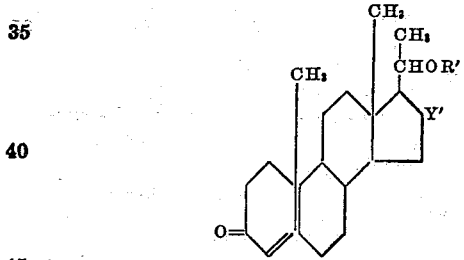

wherein R' is a lower alkanoyl radical and Y" is a carboxyl radical.

9. 20-acetoxy-3-oxopregn-4-ene-16α-carboxylic acid.
10. 20-hydroxy-3-oxopregn-4-ene-16β-carboxylic acid lactone.

References Cited in the file of this patent
UNITED STATES PATENTS

| | | |
|---|---|---|
| 2,697,109 | Dodson | Dec. 14, 1954 |
| 2,708,201 | Dodson et al. | May 10, 1955 |

OTHER REFERENCES

Veer et al.: Rec. Trav. Chim., vol. 66, pages 75–82 (1947).